(12) United States Patent
Terra et al.

(10) Patent No.: US 10,949,608 B2
(45) Date of Patent: Mar. 16, 2021

(54) DATA FEEDBACK INTERFACE

(71) Applicant: Oracle International Corporation, Redwood Shores, CA (US)

(72) Inventors: Egidio Loch Terra, San Mateo, CA (US); James Thomas McKendree, Elizabeth, CO (US); Paz Centeno, Delray Beach, FL (US); Catherine H. M. Kuo, Danville, CA (US); Susan Jane Beidler, Oakland, CA (US); Boonchanh Oupaxay, Mountain House, CA (US); Richard Lee Krenek, Pleasanton, CA (US); David Anthony Madril, Denver, CO (US); Noone Alma Savage Tongay, Tempe, AZ (US); Casey Joe Frick, Ponte Vedra, FL (US)

(73) Assignee: Oracle International Corporation, Redwood Shores, CA (US)

( * ) Notice: Subject to any disclaimer, the term of this patent is extended or adjusted under 35 U.S.C. 154(b) by 1 day.

(21) Appl. No.: 16/281,882

(22) Filed: Feb. 21, 2019

(65) Prior Publication Data
US 2019/0258707 A1 Aug. 22, 2019

Related U.S. Application Data

(60) Provisional application No. 62/633,187, filed on Feb. 21, 2018.

(51) Int. Cl.
*G06F 40/174* (2020.01)
*G06N 20/00* (2019.01)
(Continued)

(52) U.S. Cl.
CPC ....... *G06F 40/174* (2020.01); *G06K 9/00469* (2013.01); *G06K 9/00483* (2013.01);
(Continued)

(58) Field of Classification Search
CPC .................................................. G06F 40/174
See application file for complete search history.

(56) References Cited

U.S. PATENT DOCUMENTS

| 5,727,950 A | 3/1998 | Cook et al. |
| 6,347,333 B2 | 2/2002 | Eisendrath et al. |
| (Continued) | | |

FOREIGN PATENT DOCUMENTS

WO 2013/066868 A1 5/2013

OTHER PUBLICATIONS

Tsai et al., "Ontology-Mediated Integration of Intranet Web Services," Computer, p. 63-71, copyright 2003 IEEE. (Year: 2003).*
(Continued)

*Primary Examiner* — Amelia L Tapp
(74) *Attorney, Agent, or Firm* — Invoke

(57) ABSTRACT

In an embodiment, a first level of confidence corresponding to a first data set presented in a pre-populated form is computed. A visualization suggesting a need for user review in association with the first data set is displayed when the first level of confidence is determined to not meet a first threshold value. In addition, a second level of confidence corresponding to a second data set presented in the pre-populated form is computed. No visualization is presented when the second level of confidence is determined to meet the second threshold value. In an embodiment, an impact associated with an academic course modification is determined and identified according to a user selection from a displayed set of scheduled courses. The impact may include a financial impact, a graduation timeline impact, or a workload impact associated with the modification.

20 Claims, 9 Drawing Sheets

(51) Int. Cl.
   *G06K 9/00*   (2006.01)
   *G06N 5/04*   (2006.01)
(52) U.S. Cl.
   CPC ............. *G06N 5/048* (2013.01); *G06N 20/00* (2019.01); *G06K 2209/01* (2013.01)

(56) References Cited

U.S. PATENT DOCUMENTS

| | | | |
|---|---|---|---|
| 6,427,063 B1 | 7/2002 | Cook et al. | |
| 7,882,041 B2 | 2/2011 | Gibbons et al. | |
| 8,412,736 B1 | 4/2013 | Arnold et al. | |
| 8,620,831 B1 | 12/2013 | Adams | |
| 8,764,454 B1 | 7/2014 | Turner | |
| 9,299,266 B2 | 3/2016 | Crawford et al. | |
| 9,824,603 B2 | 11/2017 | Brooke et al. | |
| 9,940,606 B2 | 4/2018 | Madhavan et al. | |
| 10,229,100 B1* | 3/2019 | Lesner .................. | G06F 40/174 |
| 10,607,298 B1* | 3/2020 | Hanekamp, Jr. ..... | G06Q 40/123 |
| 2004/0009462 A1 | 1/2004 | McElwrath | |
| 2004/0138913 A1 | 7/2004 | Guerra | |
| 2004/0161728 A1 | 8/2004 | Benevento et al. | |
| 2004/0167786 A1 | 8/2004 | Grace | |
| 2004/0181749 A1* | 9/2004 | Chellapilla ........ | G06K 9/00449 715/222 |
| 2005/0198563 A1* | 9/2005 | Kristjansson ......... | G06F 40/174 715/224 |
| 2006/0252021 A1 | 11/2006 | Watkins et al. | |
| 2006/0265258 A1 | 11/2006 | Powell et al. | |
| 2009/0035733 A1 | 2/2009 | Meitar et al. | |
| 2009/0081629 A1 | 3/2009 | Billmyer et al. | |
| 2009/0083638 A1 | 3/2009 | Gupta | |
| 2009/0197234 A1 | 8/2009 | Creamer et al. | |
| 2010/0009330 A1 | 1/2010 | Yaskin | |
| 2010/0009331 A1 | 1/2010 | Yaskin et al. | |
| 2010/0009332 A1 | 1/2010 | Yaskin et al. | |
| 2010/0223194 A1 | 9/2010 | Adams | |
| 2011/0270684 A1 | 11/2011 | Holtzman | |
| 2012/0233083 A1 | 9/2012 | Strodtman et al. | |
| 2012/0233084 A1 | 9/2012 | Sardonis et al. | |
| 2012/0233108 A1 | 9/2012 | Stober et al. | |
| 2013/0011821 A1 | 1/2013 | Denley | |
| 2014/0052663 A1 | 2/2014 | Kelley et al. | |
| 2014/0074896 A1 | 3/2014 | Bushman et al. | |
| 2014/0188442 A1 | 7/2014 | Zelenka et al. | |
| 2014/0195549 A1 | 7/2014 | Ahn et al. | |
| 2014/0205987 A1 | 7/2014 | Habermehl et al. | |
| 2014/0279620 A1 | 9/2014 | Lillquist et al. | |
| 2015/0066559 A1 | 3/2015 | Brouwer | |
| 2015/0134556 A1 | 5/2015 | Spinner et al. | |
| 2015/0149379 A1 | 5/2015 | Dearmon | |
| 2015/0205777 A1* | 7/2015 | Campanelli ........ | G06K 9/00449 715/226 |
| 2015/0220880 A1 | 8/2015 | Maipady et al. | |
| 2015/0248739 A1 | 9/2015 | Schulman et al. | |
| 2015/0317604 A1 | 11/2015 | Bubna et al. | |
| 2016/0071424 A1 | 3/2016 | Harney et al. | |
| 2016/0140679 A1 | 5/2016 | Segal et al. | |
| 2016/0275634 A1 | 9/2016 | Singh et al. | |
| 2016/0371805 A1 | 12/2016 | Knotts et al. | |
| 2017/0004453 A1 | 1/2017 | Lin et al. | |
| 2017/0154308 A1 | 6/2017 | Duerr et al. | |
| 2017/0256172 A1 | 9/2017 | Kil et al. | |
| 2017/0316528 A1 | 11/2017 | Willcox et al. | |
| 2017/0365023 A1 | 12/2017 | Cox et al. | |
| 2018/0052919 A1 | 2/2018 | Feldman | |
| 2018/0189911 A1 | 7/2018 | Al-Sulaiman et al. | |
| 2018/0276205 A1 | 9/2018 | Auger | |
| 2018/0293679 A1 | 10/2018 | Bai et al. | |
| 2018/0293905 A1 | 10/2018 | Benz | |
| 2018/0350016 A1 | 12/2018 | Ward | |
| 2018/0366021 A1 | 12/2018 | Zertuche | |
| 2019/0080628 A1 | 3/2019 | Olsen | |

OTHER PUBLICATIONS

Maryalene LaPonsie, "The High School Student's Guide College Admissions", retrieved from https://web.archive.org/web/20161013154233/https://www.accreditedschoolsonline.org/resources/college-admissions-guide/; www.accreditedschoolsonline.org (Year: 2016).

Hurwitz, "The impact of legacy status on undergraduate admissions at elite colleges and universities", 2009, retrieved from https://scholar.harvard.edu/files/btl/files/michaelhurwitz_-_qp_12-12-09.pdf (Year: 2009) 48 pages.

Murtaugh, Paul A., Leslie D. Burns, and Jill Schuster. "Predicting the retention of university students" Research in higher education 40.3 (1999): 355-371. (Year: 1999) 17 pages.

Thomas Lux, et al., "Applications of Supervised Learning Techniques on Undergraduate Admissions Data", 2016, retrieved from https://dl.acm.org/doi/pdf/10.1145/2903150.2911717 (Year: 2016) 6 pages.

Waters et al., "Grade: Machine Learning Support for Graduate Admissions", 2013, Proceedings of the Twenty-Fifth Innovative Applications of Artificial Intelligence Conference (Year: 2013) 8 pages.

Al-Badarenah and Alsakran, An Automated Recommender System for Course Selection, International Journal of Advanced Computer Science and Applications, vol. 7, No. 3, pp. 166-175, 2016.

Chatbot helps students choose courses, retrieved from http://www.bbc.com/news/technology-40960426 Aug. 17, 2017, 5 pages.

Even your academic advisor might one day be a robot, retrieved from https://www.engadget.com/2016/01/14/your-academic-advisor-might-one-day-be-a-robot/ copyright 2018 engadget, 15 pages.

Grewal DS, Kaur K (2016) Developing an Intelligent Recommendation System for Course Selection by Students for Graduate Courses. Bus Eco J 7:209. doi:10.4172/2151-6219.1000209 10 pages.

Tristan Denley, Degree Compass: A Course Recommendation System, EDUCASE, Nov. 23, 2017 6 pages.

Aguiar, E., Identifying students at risk and beyond: A machine learning approach (Order No. 3733723). Available from ProQuest Dissertations and Theses Professional. (1749024112), Jul. 2015. (Year: 2015).

Aasheim et al., Knowledge and skill requirement for entry level IT workers, Journal of Information Systems Education, vol. 20(3), pp. 349-356 (Year: 2009).

* cited by examiner

DATA FEEDBACK INTERFACE

INCORPORATION BY REFERENCE; DISCLAIMER

The following application is hereby incorporated by reference: application No. 62/633,187 filed on Feb. 21, 2018. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to higher education applications. In particular, the present disclosure relates to an application interface for scheduling, enrollment, and form-filling.

BACKGROUND

A student at a higher education institution typically interacts with multiple interfaces to complete forms or tasks related to the higher education institution. The student may be required to utilize multiple systems, web sites, and paper documents to complete the forms or tasks. The student may submit data in forms to complete tasks such as scheduling classes, asking questions, and paying bills.

Some applications implement an autofill function for partially or completely filling a form for user review. An autofill function populates a form field with a corresponding data set. The autofill function may store data initially submitted by a user in relation to a field. The user-submitted data is stored in association with a field name corresponding to the field. When another field with the same field name is detected, the autofill function populates the field with the data previously submitted by the user. As an example, a user may enter "Joe" in a field with the field name "First Name". The autofill function may store the "Joe" in association with the field name "First Name." Thereafter, the autofill function monitors for other fields with the same field name. When the autofill function detects another field (for example, in another form) with the same field name "First Name", the autofill function populates the field with the value "Joe."

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
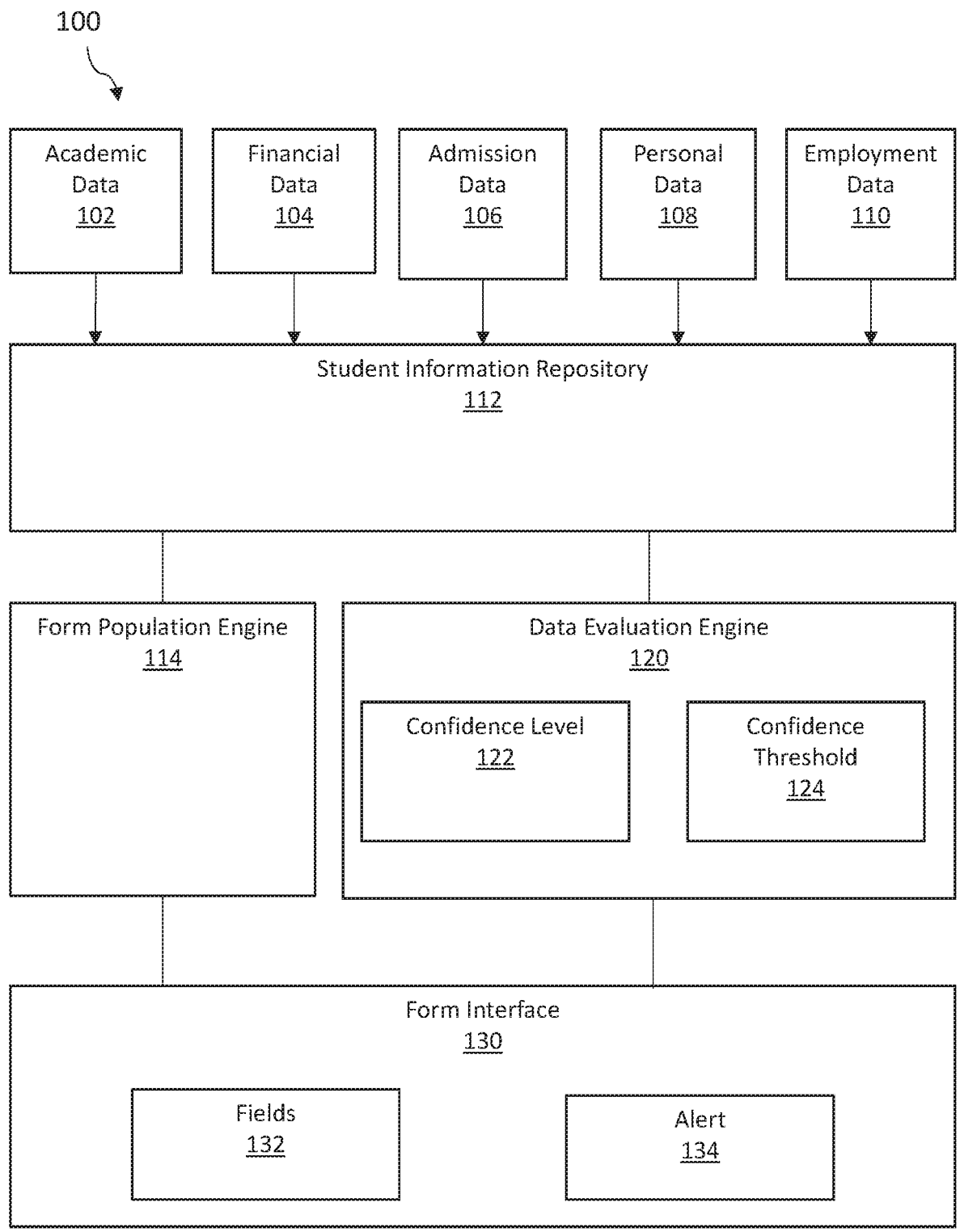
FIG. 1 illustrates a confidence-based autofilling system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONFIDENCE-BASED AUTOFILLING SYSTEM
3. MODIFICATION IMPACT DETERMINATION SYSTEM
4. AUTOFILLING INTERFACE
5. SCHEDULING AND ENROLLMENT INTERFACE
6. MISCELLANEOUS; EXTENSIONS
7. HARDWARE OVERVIEW

1. General Overview

One or more embodiments include autofilling data sets, with varying levels of confidence with respect to data accuracy, into a same form. The level of confidence for a data set may be based, for example, on a source of the data set, a date associated with the data set, and conflicts with other data sets.

As an example, the autofill data may include an unverified data set extracted from a social networking website. The unverified data set is associated with a low level of confidence with respect to data accuracy. The autofill data may include a data set verified by a higher education institution and stored in a secure database. The verified data set may be associated with a high level of confidence with respect to data accuracy.

One or more embodiments include presenting autofilled data sets with different metadata or different visualizations, based on respective levels of confidence. An autofilled data set, in a particular form, with a low level of confidence may be displayed with a visualization which suggests user review. An autofilled data set, in the same particular form, with a high level of confidence may be displayed without the visualization. The system may, for example, concurrently display: (a) an unverified data set with a visualization which suggests user review of the unverified data set and (b) a verified data set without the visualization. The visualization may include a highlighting of the data set, an underlining of the data set, or a unique font color of the data set. Alternatively, or additionally, the system may display two conflicting data sets identified for autofilling a form. The conflicting data sets may be presented for review and selection by a user.

One or more embodiments include determining and identifying an impact associated with a course modification. Initially, the system displays a set of courses, for a student, for a particular semester. The system may receive user input requesting a modification to the set of courses. The modification may have a financial impact, such as the loss of financial aid upon falling below a threshold unit count for the semester. The modification may have a graduation timeline impact, such as a course change resulting in the need for an additional semester of study. The modification may have a workload impact. As an example, the student may attempt to add a course which would result in the student being enrolled in a number of units exceeding a recommended number of units. The system may present the impact to the student in order to ensure the student selects the modification while understanding the impact.

One or more embodiments described in this Specification and/or recited in the claims may not be included in this General Overview section.

2. Confidence-Based Autofilling System

FIG. 1 illustrates a confidence-based autofilling system 100 in accordance with one or more embodiments. As illustrated in FIG. 1, the confidence-based autofilling system 100 includes a student information repository 112, form population engine 114, data evaluation engine 120, and form interface 130. In one or more embodiments, the confidence-based autofilling system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the student information repository 112 is any type of storage unit and/or device (e.g., a file system, collection of tables, or any other storage mechanism) for storing data. Further, the student information repository 112 may include multiple different storage units and/or devices. The multiple different storage units and/or devices may or may not be of the same type or located at the same physical site. Further, the student information repository 112 may be implemented or may execute on the same computing system as the form population engine 114, data evaluation engine 120, and form interface 130. Alternatively, or additionally, the student information repository 112 may be implemented or executed on a computing system separate from the form population engine 114, data evaluation engine 120, and form interface 130. The student information repository 112 may be communicatively coupled to the form population engine 114, data evaluation engine 120, and form interface 130 via a direct connection or via a network. The student information repository 112 is populated with student data comprising academic data 102, financial data 104, admission data 106, personal data 108, and employment data 110. The student data may be structured (e.g. a table). Alternatively, or additionally, the student data may be unstructured (e.g. text or social media posts).

In an embodiment, student information repository 112 is populated with student information from a variety of sources and/or systems. As an example, the student information repository 112 may be connected with a records department of a university. The student information repository 112 may be populated with academic data 102 from the records department. The academic data 102 may include any information about a student's prior or current courses such as grades, enrollment status, class size, feedback, evaluation, attendance, professors, and participation scores.

The student information repository 112 may be populated with financial data 104 from a financial department of a university. As an example, the financial data 104 may include an amount paid by a student to date. The financial data 104 may include the cost of attendance per academic unit (e.g., cost per course or course unit). The financial data 104 may include the cost of attendance per academic period (e.g., cost per semester). The financial data 104 may include financial aid granted and/or available to the student.

The student information repository 112 may be populated with admission data 106 from an admissions department of a university. As an example, the admission data 106 may include high school records for a student. The admission data 106 may include standardized test scores for the student. The admission data 106 may include academic records from other higher-learning institutions.

The student information repository 112 may be populated with employment data 110 from a career services department of a university. The employment data 110 may be in association with a particular major. As an example, employment data 110 may include employment statistics for students that graduated with a particular major. As another example, employment data 110 may include salary data for students that graduated with a particular major.

As another example, the educational institution, currently attended by the student, may have data-sharing relationships with other institutions associated with the student. The other institutions associated with the student may include educational or non-educational institutions with student information. The system may obtain shared data from the other institutions for analysis. The shared data may be stored in association with a student's profile in the student information repository 112. The educational institution, currently attended by the student, may obtain employment data 110 from the human resources departments of various companies. The educational institution, currently attended by the student, may obtain academic data 102 from other educational institutions previously attended by the student.

As another example, the student information repository 112 may be connected with a social network, an Internet Service Provider, or an email service that may have access to a student's personal data 108. The student's personal data 108 may include the student's entity affiliations, personal connections, browsing history, and interests. The system may obtain such personal data 108, possibly subject to student approval. Alternatively, or additionally, the system may obtain student interest data from an interest survey completed by the student. The system may store the personal data 108 in the student information repository 112.

In an embodiment, the form interface 130 displays a form. As an example, the form may be a college admission application. The form may include one or more elements corresponding to major selection. As another example, the form may be a scholarship application. As another example, the form may relate to a service request. Different components of the form interface 130 may be specified in different languages. The behavior of user interface elements may be specified in a dynamic programming language, such as JavaScript. The content of user interface elements may be specified in a markup language, such as hypertext markup language (HTML) or extensible markup language (XML) User Interface Language (XUL). The layout of user interface elements may be specified in a style sheet language, such as Cascading Style Sheets (CSS). Alternatively, the form interface 130 may be specified in one or more other languages, such as Java, C, or C++.

The form interface 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

In an embodiment, the form interface 130 includes, is triggered by, or is managed by a virtual assistant. The virtual assistant presents information reactively (in response to a request for the information) or proactively (without a specific request for the information). The virtual assistant may, for example, identify an upcoming college application deadline. Based on the upcoming deadline, the virtual assistant determines that a student should complete a college application form. In response to determining that a user should complete the form, the virtual assistant may present a notification to the user. The virtual assistant may present the notification with a link to the form interface 130.

In an embodiment, the form interface 130 presents a plurality of fields 132. A field 132 is a component of a form for accepting and/or presenting data. A field 132 may correspond to a particular data input, such as a name or address. Some, or all, of the fields 132 may be pre-populated by the system. Other fields 132 may be left blank, to be populated by the user.

In an embodiment, the form interface 130 includes functionality to receive user input. As an example, the form interface 130 displays a form, comprising a plurality of pre-populated fields 132, to a student. The form interface 130 further displays a message, "Is this correct?". The form interface 130 includes functionality to accept user input editing the contents of a field 132.

In an embodiment, the form population engine 114 populates the fields 132. The form population engine 114 populates a field 132 by mapping the field 132 to a corresponding data set.

In an embodiment, the form population engine 114 populates the fields 132 using data stored in the student information repository 112. The form population engine 114 may use structured data to map a data set to a field 132. As an example, student information may be stored to a table. The table may specify that the value "John Doe" corresponds to the attribute "Student Name." Accordingly, the form population engine 114 pre-populates the "Student Name" field 132 with the value "John Doe."

In an embodiment, the form population engine 114 populates the fields 132 based on user feedback. As an example, the form population engine 114 auto-fills a field 132, corresponding to a student's first name, in an admission application. The form population engine 114 locates the first name "Jonathan," corresponding to the student, in the student information repository 112. The form population engine 114 populates the first name field 132 with "Jonathan." The system presents the filled form to the student for review. The student interacts with the system to change the first name entry to "Jon." Accordingly, the system updates the student information repository 112 to use the first name "Jon" for the student. The form population engine 114 later populates fields 132 in an application for housing for the same student. Based on the updated first name data, the form population engine 114 populates the first name field 132 with "Jon."

In an embodiment, the form population engine 114 populates the fields 132 using data extracted from an image. The form population engine 114 may extract the data by executing Optical Character Recognition (OCR) on the image. As an example, a student uploads a transcript. The form population engine 114 executes OCR to extract data, comprising a plurality of data sets, from the transcript.

In an embodiment, the form population engine 114 uses a template associated with the image to identify fields 132 corresponding to each of the data sets. The form population engine 114 may select a template based on identifying information in an image. As an example, the form population engine 114 identifies the text "Topanga University" at the top of the image. Based on the text, the form population engine 114 identifies a corresponding template for transcripts from Topanga University. Alternatively, or additionally, the form population engine 114 may select a template based on a machine-learning model.

In an embodiment, the form population engine 114 uses the template to identify a data set corresponding to a field 132. The template identifies a data type or category of data stored in various locations within a document. The form population engine 114 may use the template to identify a location from which to extract a data element from the image. As an example, based on the template for Topanga University transcripts, the form population engine 114 determines that a student's total number of academic units completed are at a particular location on a transcript image. The form population engine 114 identifies a value, corresponding to the number of academic units completed at Topanga University, based on the location. The form population engine 114 uses the value to populate a corresponding field 132.

In an embodiment, the data evaluation engine 120 analyzes a data set to determine a confidence level 122 for the data set. The confidence level 122 may represent a level of confidence that a data set is accurate or up-to-date. Alternatively, or additionally, the confidence level 122 may represent a level of confidence that a particular data set corresponds to a particular field 132.

In an embodiment, the data evaluation engine 120 determines the confidence level 122 based on a date associated with the data set. As an example, the data evaluation engine 120 may assign a relatively high confidence level 122 to a data set obtained within the last month. The data evaluation engine 120 may assign a relatively low confidence level 122 to a data set obtained two years ago.

In an embodiment, the data evaluation engine 120 determines the confidence level 122 based on an identification of multiple data sets corresponding to a same form field 132. As an example, the data evaluation engine 120 identifies two transcripts for John Doe. The first transcript lists a first address. The second transcript lists a second address different from the first address. The data evaluation engine 120 determines a relatively low confidence level 122 for the selected address, based on the existence of conflicting data.

In an embodiment, the data evaluation engine 120 determines the confidence level 122 using a machine-learning model. The data evaluation engine 120 may train the machine-learning model using multiple data points. As an example, the data evaluation engine 120 may use historical data associated with data sets that correctly or incorrectly matched with a form field 132, for identifying a confidence level 122 for a new data set.

In an embodiment, the data evaluation engine 120 determines the confidence level 122 corresponding to a data set based on the extraction of data using a template image. As described above, the system may obtain data from a document based on a template. The system compares the template to the document to determine the confidence level 122.

In an embodiment, the data evaluation engine 120 bases the confidence level 122 on a similarity between data in the document and data in the template image. The confidence level 122 may be based on pixel similarity. As an example, a typed "2" has high pixel similarity with a "2" in the template image, in comparison to a handwritten "2." The handwritten 2 has relatively low pixel similarity with the 2 in the template image. Accordingly, the data evaluation engine 120 assigns a higher confidence level 122 to the typed "2" and a lower confidence level 122 to the handwritten "2."

In an embodiment, the data evaluation engine 120 bases the confidence level 122 on the position of a data set. As an example, the form population engine 114 extracts a social security number from a typed document. The social security number on the typed document is at substantially the same position on the page as the social security number on the template image. In contrast, the form population engine 114 extracts a social security number from a document filled by hand. The social security number on the hand-written document is shifted a centimeter from the position on the page where the social security number is positioned on the template image. Based on position, the data evaluation engine 120 assigns confidence levels 122 to the social security number data sets. The data evaluation engine 120 assigns a relatively high confidence level 122 to the social security number extracted from the typed document. The data evaluation engine 120 assigns a relatively low confidence level 122 to the social security number extracted from the hand-written document.

In an embodiment, the data evaluation engine 120 bases the confidence level 122 on user feedback. As an example, if user feedback is received confirming a data set, the confidence level 122 corresponding to the data set may be increased. As another example, if user feedback is received correcting a data set, the confidence level 122 corresponding to the data set may be decreased.

In an embodiment, the data evaluation engine 120 uses a confidence threshold 124 to evaluate confidence in a particular data set. The confidence threshold 124 represents a confidence level 122 below which a data set may be questionable.

In an embodiment, the data evaluation engine 120 compares the confidence level 122 for a data set to the confidence threshold 124. The data evaluation engine 120 may determine whether the confidence level 122 value for the data set meets the confidence threshold 124 value. As an example, the confidence threshold 124 value is 4. The confidence level 122 value for a data set is 5. The data evaluation engine 120 compares the confidence level 122 value of 5 to the confidence threshold 124 value of 4. The data evaluation engine 120 determines that the confidence level 122 value for the data set meets the confidence threshold 124 value.

In an embodiment, the system displays an alert 134. The system may display an alert 134 if the confidence level 122 for a data set does not meet the confidence threshold 124. The alert 134 is a visualization that suggests a need for user review in association with the data set. The alert 134 may include a message. As an example, the system displays the message, "I could not make out the GPA on your transcript well. Is the correct GPA 3.2?". The message may prompt a user to confirm or correct the data set. Additionally, or alternatively, the alert may include displaying the data set differently than other data sets. As an example, the system may display the data set in a different color than other data sets. As other examples, the system may display the data set highlighted, underlined, or circled.

3. Modification Impact Determination System

Figure 2:
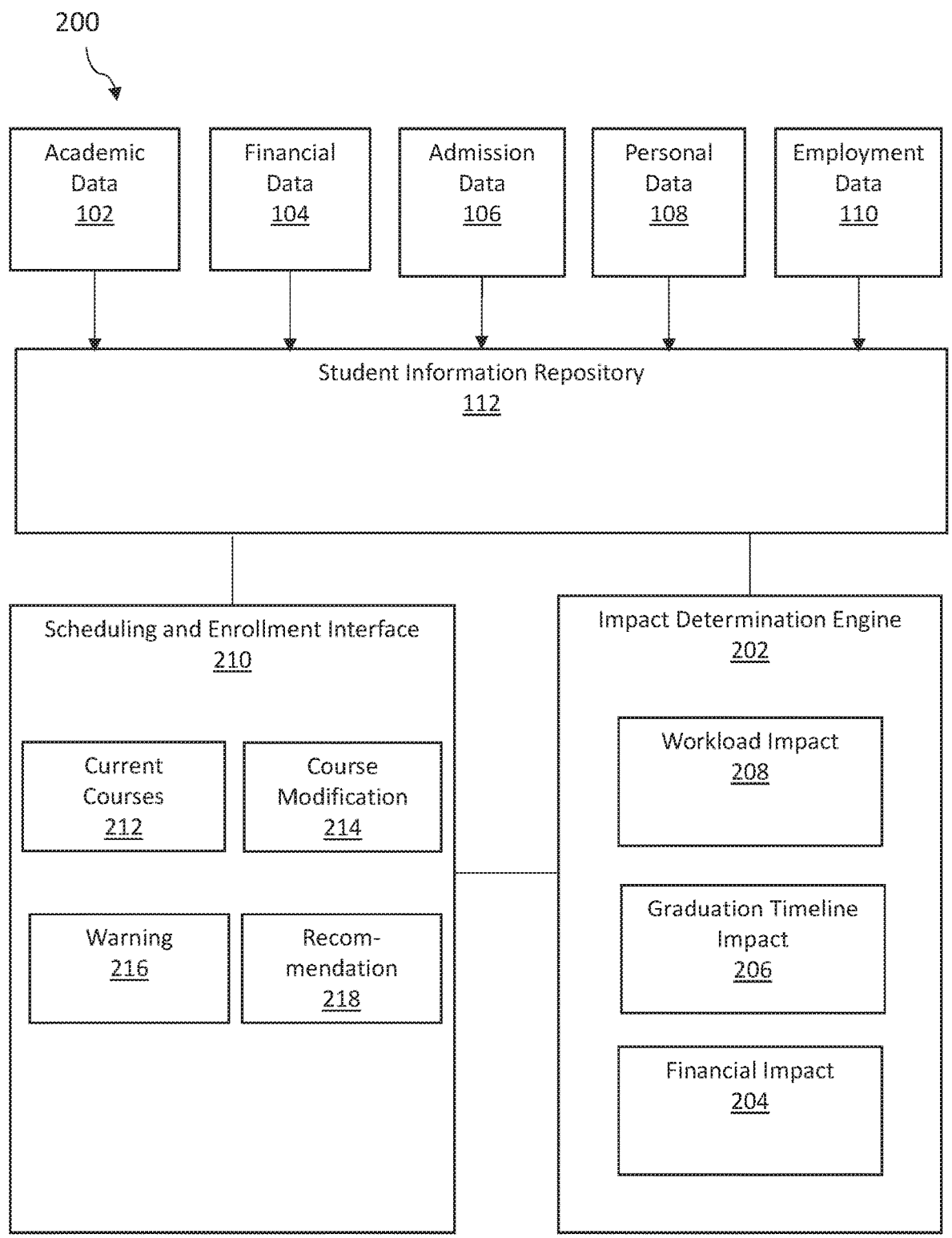
FIG. 2 illustrates a modification impact determination system in accordance with one or more embodiments.

FIG. 2 illustrates a modification impact determination system 200 in accordance with one or more embodiments.

As illustrated in FIG. 2, the modification impact determination system 200 includes a student information repository 112, scheduling and enrollment interface 210, and impact determination engine 202. In one or more embodiments, the modification impact determination system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

The student information repository 112, academic data 102, financial data 104, admission data 106, personal data 108, and employment data 110 are as described above with respect to FIG. 1.

In an embodiment, the scheduling and enrollment interface 210 refers to hardware and/or software configured to manage a schedule. The scheduling and enrollment interface 210 may render user interface elements. The scheduling and enrollment interface 210 may receive user input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

Different components of the scheduling and enrollment interface 210 may be specified in different languages. The behavior of user interface elements may be specified in a dynamic programming language, such as JavaScript. The content of user interface elements may be specified in a markup language, such as hypertext markup language (HTML) or extensible markup language (XML) User Interface Language (XUL). The layout of user interface elements may be specified in a style sheet language, such as Cascading Style Sheets (CSS). Alternatively, the scheduling and enrollment interface 210 may be specified in one or more other languages, such as Java, C, or C++.

The scheduling and enrollment interface 210 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

Figure 4A:
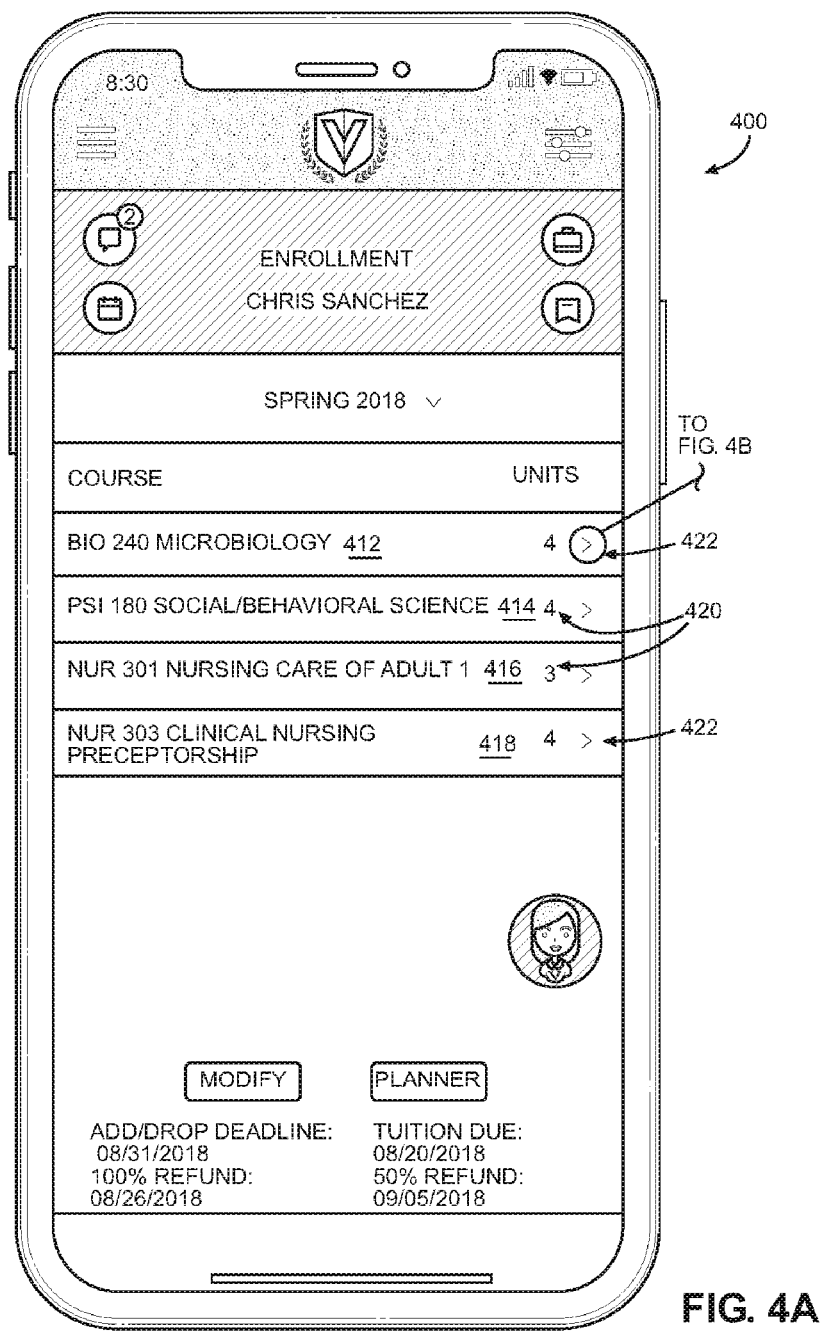
FIGS. 4A-4C illustrate scheduling and enrollment interfaces in accordance with one or more embodiments.

In an embodiment, the scheduling and enrollment interface 210 displays a course schedule. A course schedule is a set of courses, for a student, for a particular term. As examples, the term may be a semester, trimester, or quarter. The course schedule may represent courses in which the student is currently enrolled. Alternatively, the course schedule may represent courses in which the student is to be enrolled. A course schedule may be ordered. As an example, the course schedule includes classes, with respective times, ordered over the days of a week. The scheduling and enrollment interface 210 may display the schedule in a list format, as illustrated in FIG. 4A. Alternatively, or additionally, the scheduling and enrollment interface 210 may display the schedule in a calendar format.

In an embodiment, the scheduling and enrollment interface 210 displays current courses 212. A current course 212 is a course in the schedule. The current course 212 may be a course in which the student is enrolled (i.e., the schedule has been finalized to the point of enrollment). Alternatively, a current course 212 may be a course in the schedule, where the schedule has not been finalized (i.e. the schedule is being configured for finalization and enrollment at a later time).

In an embodiment, the scheduling and enrollment interface 210 includes functionality to accept a course modification 214. A course modification 214 may be the removal of a first course in conjunction with the addition of a second course. As an example, a user requests to drop a course, Biology 22, and replace the course with Physics 101. A course modification 214 may be a change to a parameter associated with a course. Parameters associated with a course may include a number of units to be earned (e.g. a four-unit version of a class or a three-unit version of the same class). Parameters associated with a course may include a particular class section (e.g. Biology 22A at 9 am or Biology 22B at 1 pm). Parameters associated with a course may include a grading option (e.g., letter grade or pass/fail).

The scheduling and enrollment interface 210 may accept a course modification 214 by presenting elements enabling a user to drag-and-drop courses from one position to another. The scheduling and enrollment interface 210 may accept a course modification 214 by presenting elements for a user to add or remove courses by typing and/or deleting text. The scheduling and enrollment interface 210 may accept a course modification 214 via a drop-down menu. The scheduling and enrollment interface 210 may present a drop-down menu comprising a set of courses for user selection. Alternatively, or additionally, the scheduling and enrollment interface 210 may present a drop-down menu comprising a set of course parameters for user selection (e.g., a set of potential grading options).

In an embodiment, the scheduling and enrollment interface 210 includes, is triggered by, or is managed by a virtual assistant. The virtual assistant presents information reactively (in response to a request for the information) or proactively (without a specific request for the information). The virtual assistant may, for example, determine that it is appropriate for the student to schedule courses for an upcoming academic term. The virtual assistant may present a notification to a student. The virtual assistant may present the notification with a link to the scheduling and enrollment interface 210.

In an embodiment, the impact determination engine 202 analyzes a course modification 214 to determine an impact of the course modification 214. The impact may be any effect which the course modification 214 has on the student's academic plan. As an example, a course modification 214 may impact a student's academic plan by extending the projected timeline for the student to graduate. A modification may have an impact, yet not violate any prerequisite rules.

In an embodiment, a graduation timeline impact 206 is a change in the projected timeline for a student to graduate. As an example, the system receives a request, from a student, to modify a schedule by dropping a course. The course is required for graduation and offered in alternate years. Dropping the course would result in the student graduating two years later. Accordingly, the modification would have a graduation timeline impact 206.

In an embodiment, a financial impact 204 is a financial change associated with an educational program. The financial impact 204 may be a change in the amount a student is projected to pay. The financial impact 204 may be a change in the financial aid available for a student. As an example, if a student is enrolled in fewer than 12 units, then the student is not eligible for financial aid. A student requests to modify a schedule by dropping a class. After the drop, the student would be enrolled in 10 units. Accordingly, dropping the class would have a financial impact 204.

In an embodiment, a workload impact 208 is a change which would affect a student's workload. The system may identify a recommended number of units per term. The system may identify the recommended number of units based on historical data for students. As an example, students enrolled in more than 22 units per academic term tend to have lower grades than students enrolled in 22 or fewer units. The system may adjust the recommended number of units for a particular student, based on factors such as employment status and demographic information. A student requests to modify the student's schedule by adding a course. The modification would result in a student being enrolled in a number of units exceeding the recommended number. Accordingly, the modification would have a workload impact 208.

In an embodiment, the system determines an impact of a modification. The system may determine the impact by determining an effect the modification would have on a current academic term. Alternatively, or additionally, the system may determine the impact by determining an effect the modification would have on future academic terms. As an example, the system determines that dropping a class would extend the student's projected timeline to graduation. Accordingly, the system identifies a graduation timeline impact 206 of the modification. Alternatively, or additionally, the system may identify a financial impact 204 and/or a workload impact 208. The system may identify an impact of the modification using a machine-learning model trained with historical student data. Responsive to determining the impact of a modification, the scheduling and enrollment interface 210 displays a warning 216 and/or recommendation 218.

In an embodiment, the warning 216 is a notification of a modification impact. The warning 216 may be displayed as a message in a pop-up window. As an example, a window displays the message, "Warning! Removal of this course could result in loss of financial aid."

In an embodiment, the recommendation 218 is a recommended alternative to the requested modification. The recommendation 218 may be displayed as a message in a pop-up window. As an example, a window displays the message, "You will graduate faster if you take Biology 22B this semester. Would you like to take Biology 22B instead of Pottery 1?"

4. Autofilling Interface

Figure 3:
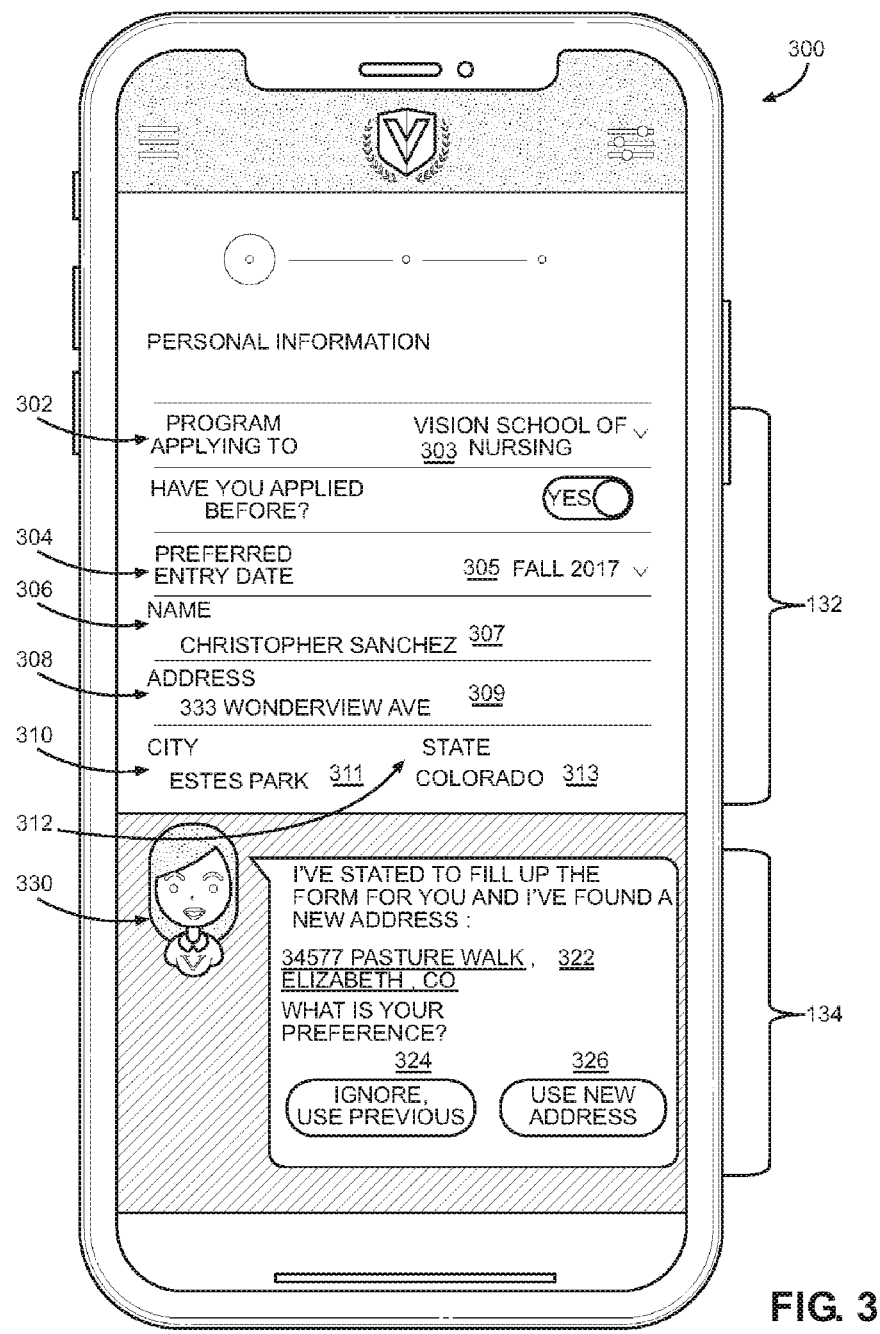
FIG. 3 illustrates an autofilling interface in accordance with one or more embodiments.

FIG. 3 illustrates an example of an autofilling interface 300 in accordance with one or more embodiments. Components and operations described in relation to this example should not be construed as limiting the scope of any of the claims.

The autofilling interface 300 displays a set of fields 132 comprising a college application. The system 100 has pre-populated six fields 132. The fields 132 are: Program Applying to 302, Preferred Entry Date 304, Name 306, Address 308, City 310, and State 312.

The system 100 has populated the field Program Applying to 302 with the data set "Vision School of Nursing" 303. The system 100 has populated the field Preferred Entry Date 304 with the data set "Fall 2017" 305. The system 100 has populated the field Name 306 with the data set "Christopher Sanchez" 307. The system 100 has populated the field Address 308 with the data set "333 Wonderview Avenue" 309. The system 100 has populated the field City 310 with the data set "Estes Park" 311. The system 100 has populated the field State 312 with the data set "Colorado" 313.

Based on a determined level of confidence in each data set, the form population engine 114 displays the data sets in different colors. The system 100 refrains from displaying a visualization suggesting a need for user review when the confidence level 122 corresponding to a data set meets a threshold value. The confidence level 122 for each of data sets 303, 305, 307, and 313 meets the threshold value. Accordingly, the system refrains from displaying a visualization suggesting a need for user review in association with data sets 303, 305, 307, and 313. Data sets 303, 305, 307, and 313 are displayed in a black font.

The confidence level 122 for data sets 309 and 311 do not meet the threshold value. Data sets 309 and 311 are displayed with an alert 134. The data sets are displayed in a yellow font, in contrast to other data sets. The interface 300 further suggests the need for user review via a message. The message indicates that a new address has been found. The message displays the new address, 34577 Pasture Walk, Elizabeth, Colo. (322). The system further displays buttons 324 and 326 to enable the user to select one of the two potential addresses.

In this example, the alert 134 is displayed via a virtual assistant 330. The virtual assistant 330 may be used to guide the user through the process of completing tasks such as filling out a college application. Alternatively, the alert 134 may be displayed without the virtual assistant 330.

5. Scheduling and Enrollment Interface

Figure 4B:
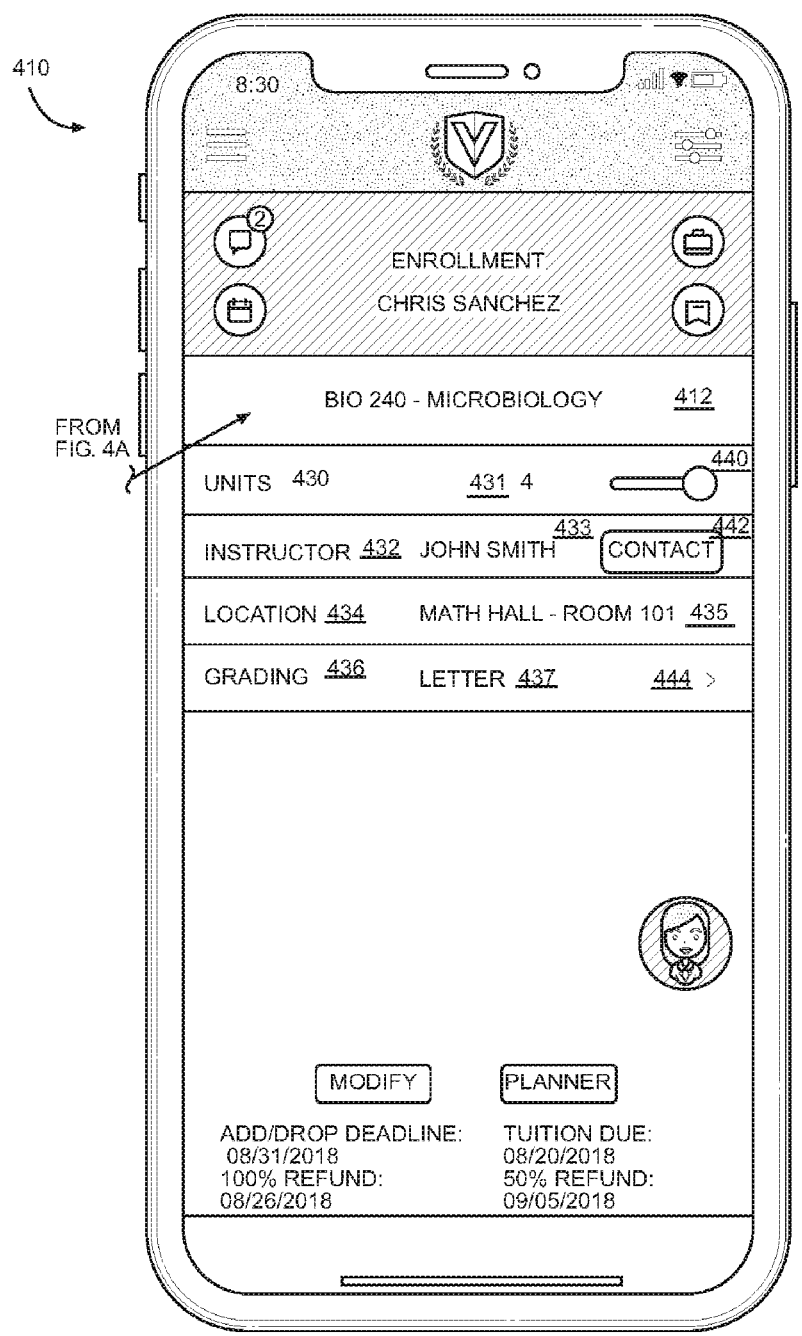
Figure 4C:
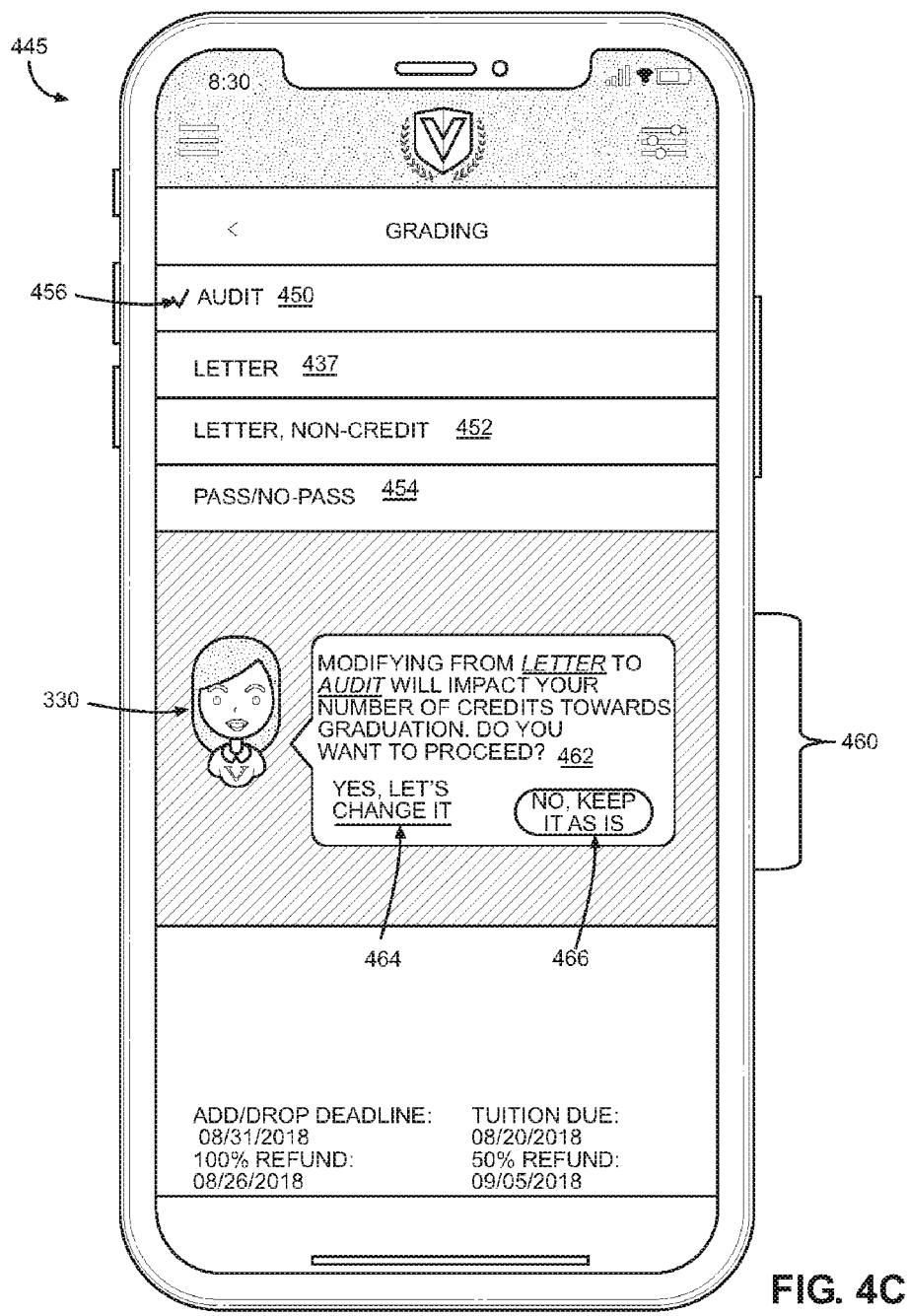

FIGS. 4A-4C illustrate example interfaces 400, 410, 445 for scheduling and enrollment, in accordance with one or more embodiments. Components and operations described in relation to this example should not be construed as limiting the scope of any of the claims.

FIG. 4A shows an interface 400 for configuring a course schedule. The interface 400 displays four courses, which have been selected for inclusion in the schedule. The courses are: BIO 240—Microbiology (412); PSI 180—Social/Behavioral Science (414); NUR 301—Nursing Care of Adult I (416); and NUR 303—Clinical Nursing Preceptorship (418). Alongside each course, the interface displays a number of units 420 corresponding to each respective course. Alongside each course, the interface further displays an arrow 422. Upon detecting user interaction with the arrow 422 beside a particular course, the system 200 displays a course parameter interface 410 corresponding to that course.

FIG. 4B illustrates an example course parameter interface 410 for the course BIO 240—Microbiology (412). Four parameters are displayed: a number of Units 430, an Instructor 432, a Location 434, and a Grading preference 436. A value, corresponding to each parameter, is displayed next to each respective parameter. The value for the number of units is "4" 431. The value for the instructor is "John Smith" 433. The value for the location is "Math Hall—Room 101" 435. The value for the grading preference is "Letter" 437.

Some of the parameters are associated with interface elements configured to accept user input. Slider 440 is configured to accept user input modifying the number of units 430. Button 442 is configured to accept user input to initiate contacting the instructor 432. Arrow 444 is displayed beside the grading option. User interaction with arrow 444 prompts the system 200 to display an interface 445 for modifying a grading option.

FIG. 4C illustrates an example interface 445 for modifying a grading option. The available grading options are displayed: Audit 450; Letter 437; Letter, non-credit 452; and Pass/No-Pass 454. As indicated by the check mark 456 displayed beside the Audit option 450, the user has selected Audit as a modified grading option.

The impact determination engine 202 determines an impact of the modification. If the user changes the grading option for the course to Audit 450, then the user's number of credits towards graduation will be impacted. Accordingly, the modification may result in a longer timeline to graduation for the student (i.e., a graduation timeline impact 206 has been identified).

Based on the identified impact, the interface 400 displays a warning 460. The warning 460 includes the message "Modifying from Letter to Audit will impact your number of Credits towards graduation, do you want to proceed?" 462. The interface 445 further displays interface elements 464, 466 for accepting user input selecting whether to proceed with the modification.

In this example, the warning 460 is displayed via a virtual assistant 330. The virtual assistant 330 may be used to guide the user through the process of completing tasks such as configuring a course schedule. Alternatively, the warning 460 may be displayed without the virtual assistant 330.

Figure 5:
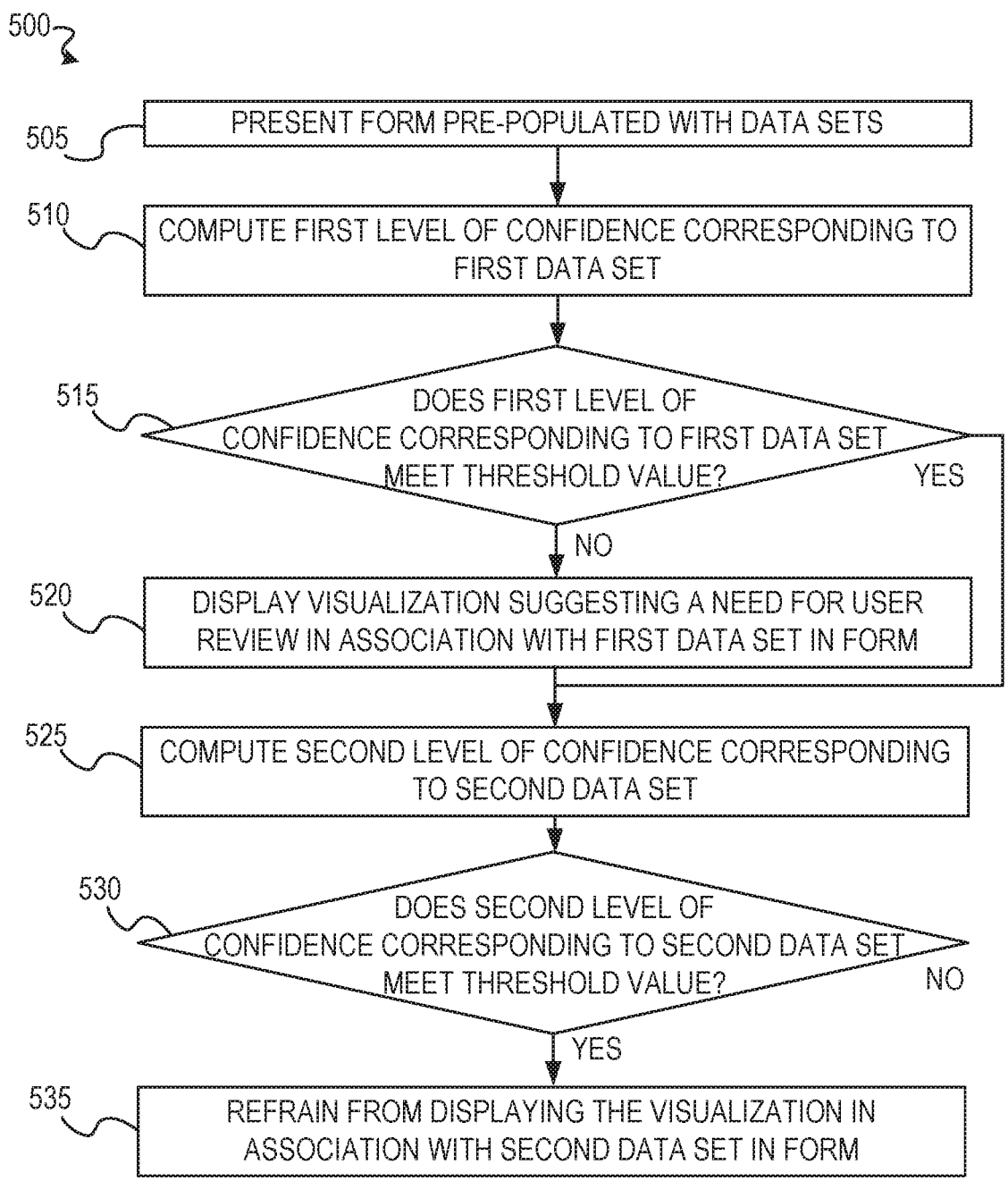
FIG. 5 shows a block diagram that illustrates an example set of operations for autofilling an interface in accordance with one or more embodiments.

FIG. 5 shows a block diagram that illustrates an example set of operations 500 for autofilling an interface in accordance with one or more embodiments. One or more operations illustrated in FIG. 5 may be modified, rearranged, or omitted altogether. Accordingly, the particular sequence of operations illustrated in FIG. 5 should not be construed as limiting the scope of one or more embodiments.

In an Operation 505, a form interface 130 presents a form having fields 132 pre-populated with data sets. The form population engine 114 may pre-populate the fields 132 of the presented form with the data sets. The form population engine 114 may map the fields 132 to corresponding data sets. The form population engine 114 may pre-populate the fields 132 using data stored in the student information repository 112. The form population engine 114 may use structured data to map data sets to the fields 132. The form population engine 114 may pre-populate the fields 132 of the form by first executing optical character recognition on an image to identify the plurality of data sets. Then, the form population engine 114 may assign each of the data sets to a respective field 132 based on a template associated with the image. The template may define a location, in the image, of a value corresponding to each respective field 132. The template may be selected based on a machine-learning model. In an embodiment, the form population engine 114 may perform optical character recognition on an image to identify a data element, and the data element may be used, at least in part, to pre-populate the form.

In an Operation 510, a data evaluation engine 120 computes a first confidence level 122 corresponding to a first data set of the data sets. The first confidence level 122 may represent a level of confidence that the first data set is accurate or up-to-date, or alternatively, corresponds to a particular field 132. The first confidence level 122 corresponding to the first data set may be computed based on a date associated with the first data set, identification of multiple data sets corresponding to a same form field 132 that is associated with the first data set, a source of the first data set, or a machine-learning model. The first confidence level 122 corresponding to the first data set may be based on a correlation between a document from which the first data set was extracted and a template used for identification of any data stored in the document.

In an Operation 515, the data evaluation engine 120 determines whether the first confidence level 122 corresponding to the first data set meets a value of a first confidence threshold 124. The data evaluation engine 120 may compare the value of the first confidence level 122 corresponding to the first data set with the value of a first confidence threshold 124 to make the determination.

In an Operation 520, responsive to the data evaluation engine 120 determining that the first confidence level 122 corresponding to the first data set does not meet a value of the first confidence threshold 124 in Operation 515, the confidence-based autofilling system 100 may display an alert 134 or visualization that suggests a need for user review, in association with the first data set in the form. If the data evaluation engine 120 does determine that the first confidence level 122 corresponding to the first data set meets the value of the first confidence threshold 124 in Operation 515, the confidence-based autofilling system 100 may not display the alert 134 or visualization.

In an Operation 525, the data evaluation engine 120 computes a second confidence level 122 corresponding to a second data set of the data sets. The second confidence level 122 may represent a level of confidence that the second data set is accurate or up-to-date, or alternatively, corresponds to a particular field 132.

In an Operation 530, the data evaluation engine 120 determines whether the second confidence level 122 corresponding to the second data set meets a value of a second confidence threshold 124. The data evaluation engine 120 may compare the value of the second confidence level 122 corresponding to the second data set with the value of the second confidence threshold 124 to make the determination.

In an Operation 535, responsive to the data evaluation engine 120 determining that the second confidence level 122 corresponding to the second data set does meet a value of the second confidence threshold 124 in Operation 530, the confidence-based autofilling system 100 may refrain from displaying an alert 134 or visualization that suggests a need for user review, in association with the second data set in the form. If the data evaluation engine 120 does not determine that the second confidence level 122 corresponding to the second data set meets the value of the second confidence threshold 124 in Operation 530, the confidence-based autofilling system 100 may display the alert 134 or visualization that suggests a need for user review, in association with the second data set in the form.

Figure 6:
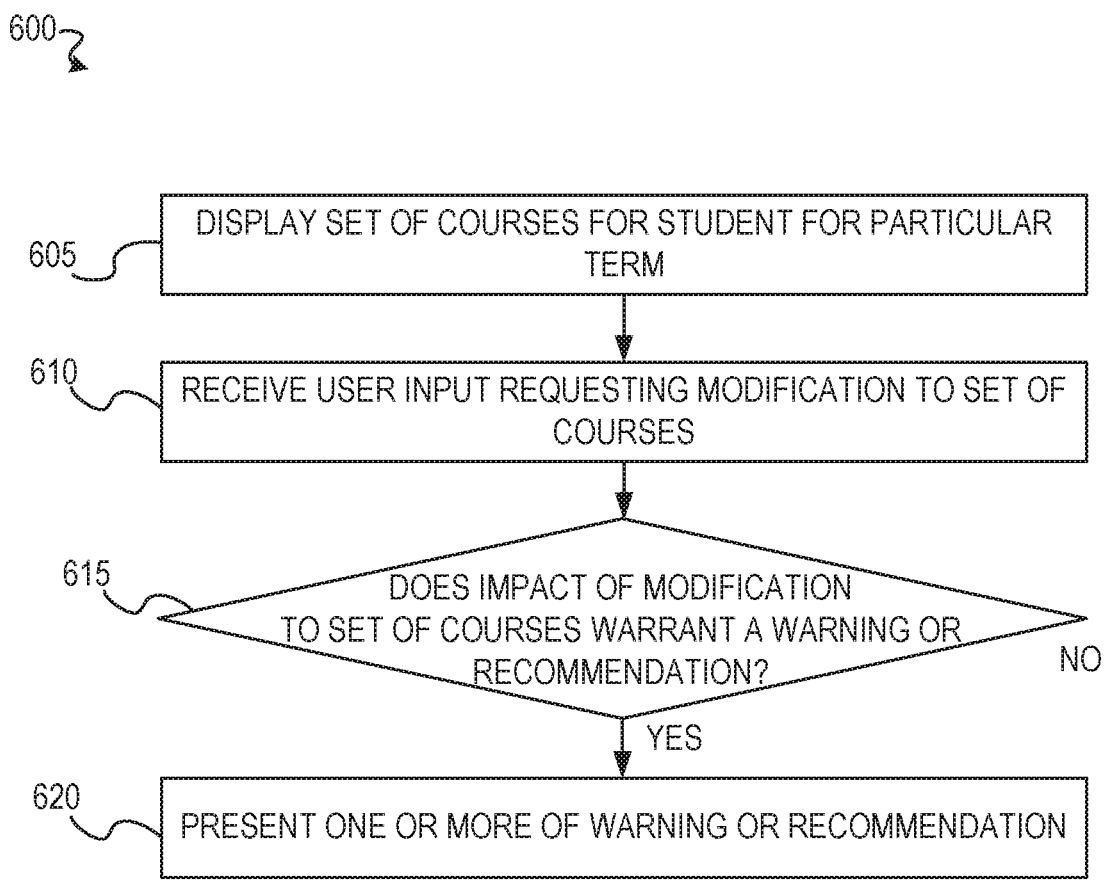
FIG. 6 shows a block diagram that illustrates an example set of operations for course scheduling and enrollment in accordance with one or more embodiments.

FIG. 6 shows a block diagram that illustrates an example set of operations 600 for course scheduling and enrollment in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an Operation 605, a scheduling and enrollment interface 210 displays a set of current academic courses 212, for a particular student, for a particular academic term. A current academic course 212 for the particular student may be an academic course 212 that the student is currently enrolled in and is presently on the student's course schedule.

In an Operation 610, the scheduling and enrollment interface 210 may receive user input requesting a course modification 214 to the set of current academic courses 212. A course modification 214 may include a removal of a first course 212 and/or an addition of a second course 212. The course modification 214 may not violate any pre-requisite rules.

In an Operation 615, the impact determination engine 202 analyzes the course modification 214 to determine whether the course modification 214 has an impact that warrants a warning 216 or a recommendation 218 to be made. The impact determination engine 202 may determine the impact of the course modification 214 based on a machine-learning model. The impact associated with the course modification 214 may be determined to include one or more of a financial impact 204, a graduation timeline impact 206, or a workload impact 208. The financial impact 204 may include a potential loss of financial aid due to the modification.

In an Operation 620, responsive to the impact determination engine 202 determining that the course modification 214 has an impact that warrants a warning 216 or a recommendation 218 to be made in Operation 615, the scheduling and enrollment interface 210 may present a warning 216 and/or a recommendation 218. The warning 216 may include a notification of an impact, e.g., consequences, of the modification 214. The warning 216 may be presented as a text message in a window, for example. The recommendation 218 may include a recommended alternative to the requested modification 214, and optionally include benefits of the recommended alternative vs. the requested modification 214. The recommendation 218 may be presented as a text message in a window, for example. Presenting the recommendation 218 may include presenting an option for a second modification 214 which is different than the originally requested modification 214.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
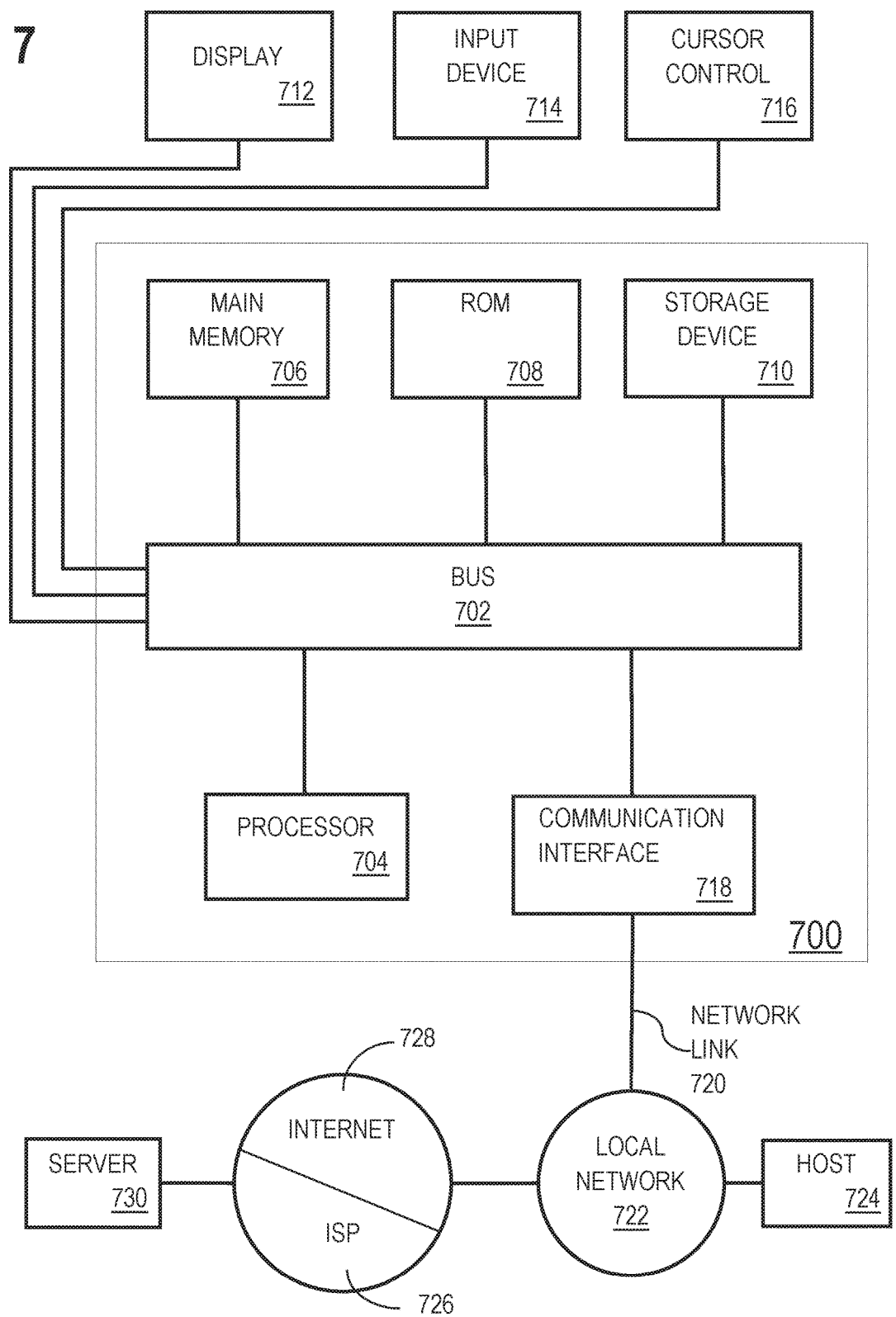
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into the remote computer's dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as the code is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
    presenting a form pre-populated with a plurality of data sets;
    computing a first level of confidence corresponding to a first data set, in the plurality of data sets;
    determining that the first level of confidence corresponding to the first data set does not meet a first threshold value;
    responsive to determining that the first level of confidence corresponding to the first data set does not meet the first threshold value: displaying a textual message that suggests a need for user review associated with the first data set and indicates a reason underlying the first level of confidence determined for the first data set, wherein the textual message is displayed in association with the first data set in the form;
    computing a second level of confidence corresponding to a second data set, in the plurality of data sets;
    determining that the second level of confidence corresponding to the second data set, in the plurality of data sets, meets a second threshold value; and
    responsive to determining that the second level of confidence corresponding to the second data set meets the second threshold value: refraining from displaying any visualization, that suggests a need for user review associated with the second data set, in association with the second data set in the form;
    wherein:
        the first data set is obtained from a first source, of a plurality of sources;
        the second data set is obtained from a second source, of the plurality of sources; and
        the textual message further indicates that the first data set is obtained from the first source.

2. The one or more non-transitory machine-readable media of claim 1, wherein the first level of confidence corresponding to the first data set is computed based on a date associated with the first data set.

3. The one or more non-transitory machine-readable media of claim 1, wherein the first level of confidence corresponding to the first data set is computed based on identification of multiple data sets corresponding to a same form field that is associated with the first data set.

4. The one or more non-transitory machine-readable media of claim 1, wherein the first level of confidence corresponding to the first data set is computed based on the first source of the first data set.

5. The one or more non-transitory machine-readable media of claim 1, wherein the first level of confidence corresponding to the first data set is computed based on a machine-learning model.

6. The one or more non-transitory machine-readable media of claim 1, wherein the operations further comprise pre-populating the form with the first data set at least by:
    executing optical character recognition on an image to identify the plurality of data sets; and
    assigning each of the plurality of data sets to a respective field based on a template associated with the image, wherein the template defines a location, of a value corresponding to each respective field, in the image.

7. The one or more non-transitory machine-readable media of claim 6, wherein the template is selected based on a machine-learning model.

8. The one or more non-transitory machine-readable media of claim 1, wherein the first level of confidence corresponding to the first data set is based on a correlation between (a) a document from which the first data set was extracted and (b) a template used for identification of any data stored in the document.

9. The one or more non-transitory machine-readable media of claim 1, wherein the operations further comprise:
    executing optical character recognition on an image, to identify a data element; and
    using the data element, at least in part, to pre-populate the form.

10. The one or more non-transitory machine-readable media of claim 1, wherein the operations further comprise:
    determining that the first source, of the plurality of sources, includes the first data set, of the plurality of data sets, for populating a first field of the form;
    determining that the second source, of the plurality of sources, includes a third data set, of the plurality of data sets, for populating the first field of the form;
    wherein the first level of confidence corresponds to populating the first field with the first data set and is determined based at least on a conflict between the first data set and the third data set.

11. The one or more non-transitory machine-readable media of claim 10, wherein the operations further comprise:
    displaying one or more interface elements for receiving user input that selects at least one of the first data set from the first source and the third data set from the third source for populating the first field.

12. The one or more non-transitory machine-readable media of claim 1, wherein:
    the first level of confidence corresponds to populating a first field of the form with a first data set and is determined based at least on a comparison between (a) a first position associated with the first data set in a document from which the first data set was extracted and (b) a second position associated with the first field in a template associated with the form.

13. A method comprising:
    presenting a form pre-populated with a plurality of data sets;
    computing a first level of confidence corresponding to a first data set, in the plurality of data sets;
    determining that the first level of confidence corresponding to the first data set does not meet a first threshold value;
    responsive to determining that the first level of confidence corresponding to the first data set does not meet the first threshold value: displaying a textual message that suggests a need for user review associated with the first data set and indicates a reason underlying the first level of confidence determined for the first data set, wherein the textual message is displayed in association with the first data set in the form;

computing a second level of confidence corresponding to a second data set, in the plurality of data sets;

determining that the second level of confidence corresponding to the second data set, in the plurality of data sets, meets a second threshold value; and responsive to determining that the second level of confidence corresponding to the second data set meets the second threshold value: refraining from displaying any visualization, that suggests a need for user review associated with the second data set, in association with the second data set in the form;

wherein:
the first data set is obtained from a first source, of a plurality of sources;
the second data set is obtained from a second source, of the plurality of sources; and
the textual message further indicates that the first data set is obtained from the first source.

14. The method of claim 13, wherein the first level of confidence corresponding to the first data set is computed based on at least one of a date associated with the first data set, identification of multiple data sets corresponding to a same form field that is associated with the first data set, the first source of the first data set, or a machine-learning model.

15. The method of claim 13, further comprising pre-populating the form with the first data set at least by:
executing optical character recognition on an image to identify the plurality of data sets; and
assigning each of the plurality of data sets to a respective field based on a template associated with the image, wherein the template defines a location, of a value corresponding to each respective field, in the image.

16. The method of claim 15, wherein the template is selected based on a machine-learning model.

17. The method of claim 13, wherein the first level of confidence corresponding to the first data set is based on a correlation between (a) a document from which the first data set was extracted and (b) a template used for identification of any data stored in the document.

18. The method of claim 13, further comprising:
executing optical character recognition on an image, to identify a data element; and
using the data element, at least in part, to pre-populate the form.

19. One or more non-transitory machine-readable media storing instructions which, when executed by one or more processors, cause performance of operations comprising:
presenting a form pre-populated with a plurality of data sets comprising a first data set obtained from a first source and a second data set obtained from a second source;
computing a first level of confidence corresponding to the first data set;
determining that the first level of confidence corresponding to the first data set does not meet a first threshold value;
responsive to determining that the first level of confidence corresponding to the first data set does not meet the first threshold value: displaying a textual message that suggests a need for user review associated with the first data set and indicates that the first data set is obtained from the first source, wherein the textual message is displayed in association with the first data set in the form;
computing a second level of confidence corresponding to a second data set, in the plurality of data sets;
determining that the second level of confidence corresponding to the second data set, in the plurality of data sets, meets a second threshold value; and
responsive to determining that the second level of confidence corresponding to the second data set meets the second threshold value: refraining from displaying any visualization, that suggests a need for user review associated with the second data set, in association with the second data set in the form.

20. The one or more non-transitory machine-readable media of claim 19, wherein:
the first level of confidence corresponds to populating a first field of the form with a first data set and is determined based at least on a comparison between (a) a first position associated with the first data set in a document from which the first data set was extracted and (b) a second position associated with the first field in a template associated with the form.

* * * * *